Figure 1:
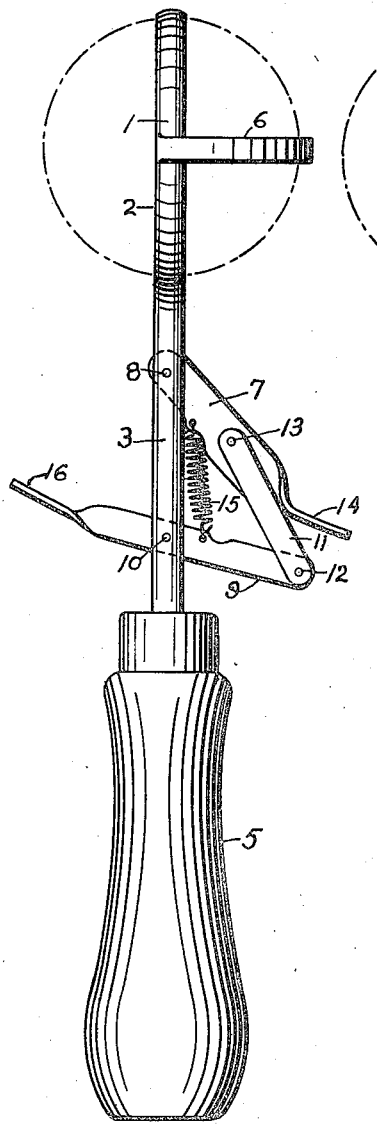

July 6, 1948.  H. A. ALHEIT  2,444,486

ICE CREAM CUTTING AND DISCHARGING DEVICE

Filed May 3, 1945

Inventor:
Henry A. Alheit,
Heard Smith & Tennant
Attorneys

Patented July 6, 1948

2,444,486

UNITED STATES PATENT OFFICE 2,444,486

ICE-CREAM CUTTING AND DISCHARGING DEVICE

Henry A. Alheit, Milton, Mass.

Application May 3, 1945, Serial No. 591,679

8 Claims. (Cl. 107—48)

This invention relates to improvements in means for removing and dispensing uniform balls of ice cream or like semi-solid matter from a confined mass thereof. The term "ball" is used herein as descriptive of spheroidal, ellipsoidal, pear-shaped, or other form of units of the material.

The present invention will be particularly described with respect to a device for dispensing ice cream confined in containers such as are employed in soda fountains, restaurants, and the like, but it will be understood that the invention may be similarly used for removing predetermined amounts from masses of other semi-solid or plastic materials.

Ice cream is usually delivered from the factory in which it is made to soda fountains, restaurants, picnics, or other assemblages of people, in cylindrical containers of two and one-half and five gallon capacity.

When the ice cream composition is frozen the resulting ice cream is of a granular crystalline character containing quite a large volume of air and when scoopfuls are removed from the mass by usual dispensing devices the operator presses the scoop downwardly into the mass of ice cream and toward the wall of the container in order to fill the scoop. This action squeezes out a very considerable portion of the air in the ice cream contained in the scoop and also compresses the material in the container in the direction in which pressure is applied to the scoop, so that the volume of several scoopfuls of the original mass is wasted because of such exclusion of air.

Usual ice cream dispensing means are in the form of hollow conical or hemispherical scoops which are thrust edgewise into the ice cream toward the wall of the container and the scoop is then withdrawn and the contents deposited in a dish to be served to the customer. The sizes of the scoops are regulated in many States by the authorities on weights and measures. However, in the use of such scoops the portions dispensed vary considerably from the intended predetermined volume either by failure properly to fill the scoop or by considerable additional material which is heaped above the mouth of the scoop even when the scoop is partially rotated in the mass before its withdrawal.

Usual scoops are not provided with means for cutting or moulding the material extracted from the mass into symmetrical form of predetermined volume and this in turn adds to the wastage of the original volume of the mass.

One of the objects of the present invention is to provide a dispensing device which will accurately remove predetermined uniform units of material from the mass without improperly compacting the material of the unit or that in the container and which will enable uniform amounts to be dispensed which will be fair both to the customer and to the owner of the mass.

This is accomplished in the present invention by providing a cutter and dispenser comprising a loop of thin rigid material symmetrically curved with respect to a diametrical axis of rotation of the loop with means, such as a handle, connected to the loop at one end of said axis of rotation, operable to swing the loop edgewise into the mass and thereupon to rotate the loop about said axis to sever a predetermined symmetrical unit from the mass without compressing it and provided with arcuate means connecting opposite portions of the loop having the same curvature as the path of the connected portions of the loop for retaining the severed ball in the loop during transportation thereof from the mass to the customer's dish or other receptacle.

A further object of the invention is to provide manually operable means conveniently manipulated by the operator to discharge the severed unit from the loop and comprising means for withdrawing the discharging member from the path of rotation of the loop about its axis.

These and other objects and features of the invention will more fully appear from the following description and the accompanying drawing and will be particularly pointed out in the claims.

Figure 2:
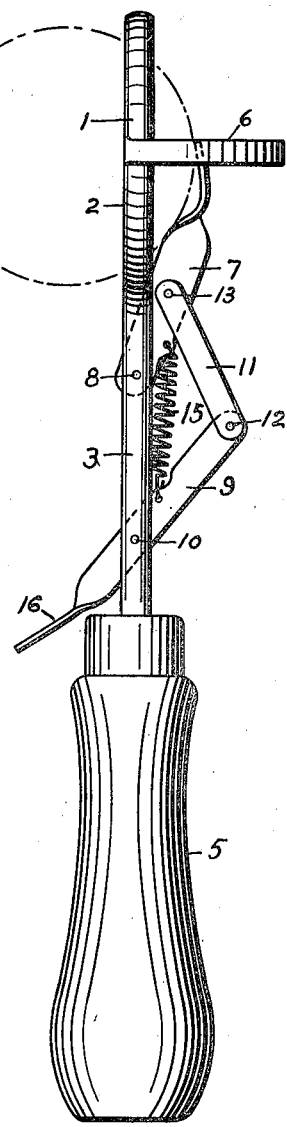
Figure 3:
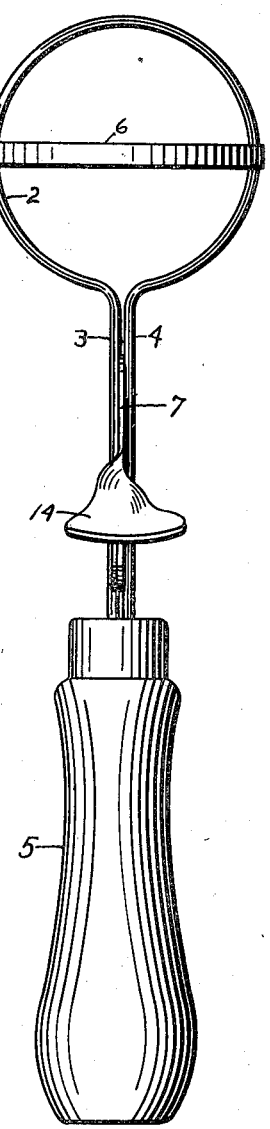

A preferred embodiment of the invention is illustrated in the accompanying drawings, in which, Fig. 1 is a side elevation of a device for cutting spheroidal balls from a mass of ice cream or the like and insuring the transportation thereof and illustrating in retracted position a preferred mechanism for discharging the ball;

Fig. 2 is a similar view illustrating the discharging device in the act of delivering the ball from the cutter and dispenser; and, Fig. 3 is a plan view of the construction shown in Fig. 1.

The invention illustrated in the accompanying drawing comprises an improvement upon the ice cream dispenser disclosed in my prior application Serial Number 540,103, filed June 13, 1944, and differs therefrom with respect to the manner in which the ball or unit of severed material is retained in the dispenser for transportation and also in the means for discharging the ball from the cutting and dispensing device. In my prior application various forms of cutters are illustrated and described and obviously any of such forms can be employed in the present construction.

The cutter and dispenser for ice cream and like materials illustrated in the accompanying drawing comprises a strip of narrow thin rigid non-corrosive material formed into a preferably cylindrical loop 1 provided with a sharp edge 2 the adjacent ends of the loop having closely associated parallel extensions 3 and 4 forming a shank upon which a suitable handle 5 is mounted, the handle being secured to the shank at such convenient distance from the loop as to enable it to be manipulated in the manner hereinafter described. The shank of the loop desirably extends outwardly in the direction of the axis of rotation of the loop but may be otherwise positioned with respect to the end of the axis of rotation of the loop as will enable the loop to be swung into the mass of ice cream and then rotated about its axis in the manner described.

In order to retain the ball of material in the loop for transportation an arcuate member, preferably in the form of a narrow semi-cylindrical strip 6 having the same curvature as that of the path of the loop when the latter is rotated about its axis, is secured at its ends, preferably by welding, to diametrically opposite portions of the loop at right angles to the axis of rotation of the loop. It will be understood, however, that such member for retaining the ball in the loop may be of different arcuate or hollow spheroidal form so long as its curvature conforms to the path of rotation of the cutting edge of the loop when the latter is rotated about its axis in the mass of ice cream.

Suitable means are provided for discharging the ball of material from the loop. The preferred construction which is illustrated herein comprises a lever 7 one end of which preferably is located between the members 3 and 4 of the shank and secured therein by a pivotal stud 8. The finger-actuated lever 9 is similarly mounted between the sections 3 and 4 of the shank upon a pivot 10. A link 11 is pivotally connected to the end of the finger lever 9 by a pin 12 and its opposite end is connected by a pin 13 to a central portion of the lever 7.

The lever 7 is of such length that when swung about its pivot 8 its end, which preferably is in the form of a broadened end portion 14, will swing beneath the arcuate member 6 and engage a ball of ice cream in the holder in approximately the direction of radius perpendicular to the plane of the loop so that the ball will be forced from the loop as illustrated in Fig. 2 without distortion. A spiral spring 15, which is connected at one end to the lever 9 intermediate of its pivot 10 and the pivot of the link 12 and which is connected at its other end to the lever 7 between its pivot 8 and the pivot 13 to the link 11, tends normally to swing the portions of the levers which are connected together toward each other as illustrated in Fig. 1, thereby removing the ball-discharging lever 14 fully out of the path of rotation of the loop as illustrated in Fig. 1. When the finger lever is actuated to discharge the ball by pressure of the finger upon the finger portion 16 of the lever, which preferably is flattened, the lever 7 will be swung toward the position shown in Fig. 2 to discharge the ball in the manner above described.

In the operation of the invention the cutting loop is first swung edgewise downwardly and laterally into the mass of ice cream until the axis of rotation is in a substantially vertical position with the cutting loop wholly beneath the surface of the mass. The handle is then rotated to rotate the loop about its axis of rotation thereby severing a symmetrical unit of material from the mass without in any wise compressing the material of the unit or that of the mass. When the unit or ball has thus been severed from the mass the cutter and dispenser is raised from the mass with the arcuate support beneath it. When held in this position it can be readily transported to a suitable distance. Thereupon the discharging mechanism may be actuated in the manner above described by pressing the finger lever so that the ball can be safely and accurately deposited in a suitable cup or other receptacle.

It is found by actual test of a cutter having 2″ diameter of the construction herein described as compared with the usual commercial hollow hemispherical scoop of 2″ diameter that approximately 125 spherical balls can be cut and dispensed by the applicant's invention from a 2½ gallon container of ice cream as compared with 90 balls which is the largest amount which could be scooped from 2½ gallons in a like container, by the usual form of scoop.

It will therebore be obvious that by reason of the present invention a great saving of the ice cream is made for the owner and each customer is provided with a uniform amount of ice cream to which he is entitled.

Having thus described the invention, what is claimed as new and desired to be secured by Letters Patent is:

1. A cutter and dispenser for removing uniform predetermined units of ice cream or the like from a confined mass thereof comprising a loop of thin rigid narrow material symmetrically curved with respect to a diametrical axis of rotation of said loop, a handle connected to said loop at one end of said axis operable to swing the loop edgewise into the mass and then rotate the loop about said axis to sever a predetermined unit from the mass without compressing the material, and a narrow arcuate member perpendicular to and connecting opposite portions of said loop having the same radius of curvature as the connected portions of the loop operable when the loop is rotated about its axis to sever the predetermined unit from the mass and to retain the severed unit within the loop during its removal from the mass and transportation therefrom.

2. A cutter and dispenser for removing uniform predetermined units of ice cream or the like from a confined mass thereof comprising a loop of thin rigid narrow materials symmetrically curved with respect to a diametrical axis of rotation of said loop, a handle connected to said loop and extending outwardly therefrom in the direction of said axis operable to swing said loop edgewise into the mass and then to rotate the loop about said axis to sever a predetermined unit from the mass without compressing it, a narrow thin arcuate member perpendicular to and connected at its ends to opposite portions of said loop at equal distances from an end of said axis and having the same radius of curvature as the path of the connected portions of the loop operable when the loop is rotated about its axis to sever the predetermined unit from the mass and to retain the severed unit in the loop during its removal from the mass and transportation therefrom.

3. A cutter and dispenser for removing uniform predetermined units of ice cream or the like from a confined mass thereof comprising a loop of thin rigid narrow material symmetrically curved with respect to a diametrical axis of rotation of said loop, a handle having a long shank connected to said loop at one end of said axis operable to swing the loop edgewise into the mass and then rotate the loop about said axis to sever a predetermined unit from the mass without compressing the material, a narrow arcuate member perpendicular to and connecting opposite portions of said loop having the same radius of curvature as the connected portions of the loop operable when the loop is rotated about its axis to sever the predetermined unit from the mass and to retain the severed unit within the loop during its removal from the mass and transportation therefrom, and manually operable means for discharging the severed unit mounted on the shank of said handle and having means movable toward said axis into engagement with said unit in proximity to said arcuate member and capable of being moved out of the path of rotation of the loop.

4. A cutter and dispenser for removing uniform predetermined units of ice cream or the like from a confined mass thereof comprising a loop of thin rigid material symmetrically curved with respect to a diametrical axis of rotation of said loop, a handle connected to said loop and extending outwardly therefrom in the direction of said axis operable to swing said loop edgewise into the mass and then to rotate the loop about said axis to sever a predetermined unit from the mass without compressing it, a narrow arcuate member connected at its ends to opposite portions of said loop at equal distances from an end of said axis and having the same curvature as the path of the connected portions of the loop when the loop is rotated about its axis and acting to retain the severed unit in the loop during its removal from the mass and transportation therefrom, finger-actuated mechanism pivotally mounted upon said handle having means to engage said unit in proximity to said arcuate member to discharge the unit from the loop, and means for retracting said discharging means out of the path of rotation of the loop.

5. A cutter and dispenser for removing uniform spheroidal balls of ice cream or the like from a confined mass thereof without compressing the material comprising a narrow cylindrical ring of thin rigid non-corrosive material having a sharp cutting edge, a handle for rotating the ring about a diametrical axis having a straight shank of small diameter rigidly connected to said ring at one end of said axis of rotation and extending outwardly therefrom in the direction of said diametrical axis, and a semi-circular transverse ring section connected diametrically to opposite portions of said ring perpendicular with respect to the plane of the axis of said loop and having the same radius of curvature as that of the ring.

6. A cutter and dispenser for removing uniform spheroidal balls of ice cream or the like from a confined mass thereof without compressing the material comprising a narrow cylindrical ring of thin rigid non-corrosive material having sharp cutting edges, a handle for rotating the ring about a diametrical axis rigidly connected to said ring at one end of said axis of rotation and extending outwardly therefrom in the direction of said diametrical axis, a semi-circular transverse ring section connected diametrically to opposite portions of said ring perpendicular with respect to said axis and having the same radius of curvature as that of the ring, a lever pivotally connected to said handle member having a free end adapted to engage said unit in proximity to said ring section, manually operable means for actuating said lever to discharge the unit from the ring, and resilient means for retracting said lever from the path of rotation of said ring.

7. A cutter and dispenser for removing spheroidal balls of ice cream or the like from a confined mass thereof without compressing the material comprising a narrow thin strip of rigid non-corrosive material in the form of a circular loop having adjacent parallel end sections extending from said loop outwardly in the direction of an axis thereof, forming a shank, a handle mounted on said shank operable to swing the loop edgewise into the mass and then to rotate the loop about its axis, to sever a spheroidal ball therefrom, means for retaining the severed unit in said loop during its withdrawal from said mass by the handle a lever pivotally mounted on said shank having a relatively wide free end movable into engagement with the severed ball, manually operable means for actuating said lever to discharge the ball, and spring actuated means for swinging said lever out of the path of rotation of said loop.

8. A cutter and dispenser for removing spheroidal balls of ice cream or the like from a confined mass thereof without compressing the material comprising a narrow thin strip of rigid non-corrosive material in the form of a circular loop having adjacent parallel end sections extending from said loop outwardly in the direction of an axis thereof, forming a shank, a handle mounted on said shank operable to swing the loop edgewise into the mass and then to rotate the loop about its axis, to sever a spheroidal ball therefrom, a thin narrow semi-circular member connected to diametrical opposite portions of said loop perpendicular with respect to the plane of the axis of the loop, a flat lever pivotally mounted on said shank between the sections thereof having an integral relatively wide free end portion positioned at right angles to the plane of said lever to engage the severed ball, a finger-actuated lever pivotally mounted between the sections of said shank in closer proximity to said handle, a link connecting the end of said finger-actuated lever to said ball-engaging lever operable upon actuation of said finger lever to cause the ball-engaging lever to engage and discharge the ball from said loop, and a spring connecting said levers acting to swing said ball engaging lever to inoperative position out of the path of rotation of the loop upon release of pressure upon said finger lever.

HENRY A. ALHEIT.

REFERENCES CITED

The following references are of record in the file of this patent:

UNITED STATES PATENTS

| Number | Name | Date |
|---|---|---|
| 124,375 | Munson | Mar. 5, 1872 |
| 303,022 | Kilborn | Aug. 5, 1884 |
| 554,550 | Thode | Feb. 11, 1896 |
| 659,146 | Hayden | Oct. 2, 1900 |
| 990,138 | Johnson | Apr. 18, 1911 |
| 1,368,448 | Minch | Feb. 15, 1921 |
| 1,529,319 | Manos | Mar. 10, 1925 |
| 1,561,558 | Manos | Nov. 17, 1925 |
| 1,966,089 | Chester | July 10, 1934 |

FOREIGN PATENTS

| Number | Country | Date |
|---|---|---|
| 1,459 | Great Britain | Jan. 18, 1902 |